US012230147B2

(12) United States Patent
Grimald et al.

(10) Patent No.: US 12,230,147 B2
(45) Date of Patent: Feb. 18, 2025

(54) SYSTEM FOR ESTABLISHING AN OPERATIONAL FLIGHT PLAN AND RELATED PROCESS

(71) Applicant: DASSAULT AVIATION, Paris (FR)

(72) Inventors: Cyrille Grimald, Boulogne Billancourt (FR); Benjamin Briand, Rueil Malmaison (FR)

(73) Assignee: DASSAULT AVIATION, Paris (FR)

( * ) Notice: Subject to any disclaimer, the term of this patent is extended or adjusted under 35 U.S.C. 154(b) by 584 days.

(21) Appl. No.: 16/357,639

(22) Filed: Mar. 19, 2019

(65) Prior Publication Data

US 2019/0295425 A1 Sep. 26, 2019

(30) Foreign Application Priority Data

Mar. 20, 2018 (FR) ..................................... 18 00231

(51) Int. Cl.
*G08G 5/00* (2006.01)

(52) U.S. Cl.
CPC ......... *G08G 5/0034* (2013.01); *G08G 5/0013* (2013.01); *G08G 5/0021* (2013.01); *G08G 5/0091* (2013.01)

(58) Field of Classification Search
CPC .. G08G 5/0034; G08G 5/0013; G08G 5/0021; G08G 5/0091
See application file for complete search history.

(56) References Cited

U.S. PATENT DOCUMENTS 4,642,775 A 2/1987 Cline et al.
4,819,183 A * 4/1989 O'Brien et al. ......... B67D 5/00 364/509
8,660,720 B2 * 2/2014 LaPorte ............... G05D 1/0661 701/410
9,177,479 B2 * 11/2015 Castillo-Effen ...... G08G 5/0034
9,180,962 B2 * 11/2015 Moser ........................ B64C 9/06
9,572,080 B1 * 2/2017 Wang .................... H04W 36/18
9,950,809 B2 * 4/2018 Breban .................. B64D 45/00
10,053,228 B2 * 8/2018 Kahn .................... G07C 5/0841
10,242,582 B1 * 3/2019 Ogden et al. ............ G08G 5/02
(Continued)

OTHER PUBLICATIONS

Search Report for priority application FR1800231.

*Primary Examiner* — Dale W Hilgendorf
*Assistant Examiner* — Frank T Glenn, III
(74) *Attorney, Agent, or Firm* — Davidson Kappel LLC

(57) ABSTRACT

A system for establishing an operational flight plan includes a basic flight data acquisition unit for acquiring basic flight data from an external flight plan development system, the basic flight data comprising at least one theoretical fuel weight to be loaded into the aircraft. The system also includes an aircraft actual operational specifications acquisition unit for acquiring actual operational specifications of the aircraft, the actual operational specifications including an airplane context; a proposed flight data calculating unit for calculating proposed flight data including at least one proposed weight of fuel corresponding to the theoretical weight, calculated based on actual operational specifications of the aircraft and a specified trajectory of the aircraft; and a viewer, and a display manager capable of displaying a proposed flight data display window including the proposed fuel weight.

17 Claims, 10 Drawing Sheets

(56) References Cited

U.S. PATENT DOCUMENTS

| | | | | |
|---|---|---|---|---|
| 2007/0150178 | A1* | 6/2007 | Fortier | G08G 5/0034 701/467 |
| 2011/0087424 | A1* | 4/2011 | Long | G01G 19/07 701/124 |
| 2013/0046422 | A1* | 2/2013 | Cabos | G08G 5/0021 701/120 |
| 2013/0075532 | A1 | 3/2013 | Fuscone et al. | |
| 2013/0126676 | A1* | 5/2013 | Travers | B64D 37/16 244/135 A |
| 2015/0279218 | A1 | 10/2015 | Irrgang et al. | |
| 2016/0125744 | A1* | 5/2016 | Shamasundar | G08G 5/0091 701/122 |
| 2018/0189704 | A1* | 7/2018 | Kumar | G08G 5/0034 |
| 2020/0027363 | A1* | 1/2020 | Vana | G08G 5/0043 |

* cited by examiner

SYSTEM FOR ESTABLISHING AN OPERATIONAL FLIGHT PLAN AND RELATED PROCESS

The present invention relates to a system for establishing an aircraft operational flight plan, including:

- a module for acquiring basic flight data from an external flight plan development system, the basic flight data comprising at least one theoretical fuel weight to be loaded into the aircraft.

Such an establishment system is for example able to be integrated into an offboard mission planning system, in particular into an electronic flight bag (EFB), generally made up of a portable electronic device, and/or into an airport infrastructure for establishing aircraft trajectories.

Alternatively, the system is intended to be integrated into a cockpit, in parallel with a flight management system (FMS), to allow the crew to determine mission trajectories.

The preparation and definition of an aircraft mission between a first geographical point and a second geographical point is a time-consuming task. It in particular requires determining the route that the aircraft will follow, the associated flight profile, and the passenger, freight and fuel load.

These flight data are generally reiterated in a regulatory document called "operational flight plan" validated by the crew and filed with air traffic control entities.

BACKGROUND

In a known manner, when a client sends a flight request to an operator, a dispatcher is tasked with preparing the flight within the operator by managing both the logistical aspects (for example authorizations, airport services, hotel reservations, etc.) and the technical aspects of the mission (in particular the routes, performances, weather, hazard management).

Then, the dispatcher specifies simplified parameters of the mission, for example the date, the time, the starting point, the destination and the type of aircraft. He sends these specifications to a commercial flight plan service provider.

The flight plan service provider establishes a trajectory for the aircraft, taking into account the type of aircraft, the weather, the flight authorizations, and contacts the air traffic control entities to obtain the flight authorizations. The service provider then gives the dispatcher a flight file that contains, in paper form, an operational flight plan, the logistical details and weather information.

The operational flight plan in particular contains the on board fuel data, the detailed route with the different waypoints and the expected passage times by these waypoints.

The dispatcher provides the crew with the operational flight plan, and the latter crosschecks, using several third-party applications, the data obtained from the flight plan service provider, in particular regarding on-board fuel.

It then validates the operational flight plan by signing it. It manually copies the data from this flight plan into the flight management system. The route data may also automatically pass to the avionics by using a subscription service.

During the flight, the crew notes by hand, on the operational flight plan, the navigation data read on the screens of the flight management system, in order to compare them to the flight data obtained from the service provider and thus perform a navigation reading.

Lastly, at the end of the flight, the operational flight plan, annotated by the crew, is returned and archived in paper form.

Such a flight plan establishment process is not fully satisfactory. Firstly, the data calculated by the service provider is often approximate and only partially accounts for the actual context of the aircraft having to perform the mission. Indeed, the performance is not identical from one aircraft to another, even if the aircraft are the same model, in particular due to the equipment present on the aircraft and their states of wear and any malfunction (case of failure and/or permission to leave or "dispatch").

Furthermore, copying the information into the flight management system is time-consuming and tedious, and is a source of errors.

Any last-minute change requires redoing at least part of the process, which can be cumbersome and stressful for the crew to manage.

SUMMARY OF THE INVENTION

One aim of the present disclosure is therefore to provide a system for establishing an operational flight plan making it possible to greatly simplify the crew's task before, during and after the flight, while providing a precise operational flight plan adapted to the mission and the aircraft used to perform the mission.

A system of the aforementioned type is provided, characterized by:

- a module for acquiring actual operational specifications of the aircraft intended to perform the flight according to the operational flight plan, the actual operational specifications including an airplane context;
- a module for calculating proposed flight data including at least one proposed weight of fuel corresponding to the or each theoretical weight, calculated based on actual operational specifications of the aircraft and at least one specified trajectory of the aircraft;
- a viewer, and a display management assembly on the viewer, capable of displaying, on the viewer, a proposed flight data display window including at least the proposed weight of fuel.

The system according to the invention may comprise one or more of the following features, considered alone or according to any technically possible combination:

- the basic flight data have been obtained without taking account of the airplane context and/or a mission context;
- it includes a module for communicating with a flight management system, capable of loading, in the flight management system, proposed flight data and/or flight data entered by the crew in the proposed flight data display window;
- the communication module is able to recover, after loading proposed flight data and/or entered flight data, flight data developed by the flight management system based on proposed and/or entered flight data, the system including an application for checking the consistency between the flight data developed by the flight management system and the proposed flight data and/or the entered flight data;
- it includes a module for communicating with a flight management system, capable of acquiring navigation data read during the flight by the flight management system for at least one waypoint of the aircraft on the defined trajectory;

- the display management assembly is able to display at least one window for reading successive waypoints of the aircraft along the defined trajectory, the window for reading successive waypoints including, during flight, the navigation data read for at least one waypoint by the flight management system;
- the window for reading successive waypoints of the aircraft displays the navigation data read for at least a first waypoint by which the aircraft has already passed, and displays the next waypoint to be reached by the aircraft;
- the display management assembly is able to display at least one window for displaying successive waypoints including at least one trajectory modification symbol illustrating a direct navigation to a later waypoint without passing by at least one intermediate waypoint, and/or an interface for entering a modification of the specified trajectory;
- it includes a module for automatic development of an end-of-flight reading including at least part of the navigation data read during the flight, and a module for unloading the end-of-flight statement to a ground system;
- the module for acquiring operational specifications of the aircraft is able to acquire structural data relative to the aircraft, in particular structural specificities of equipment of the aircraft, and/or structural modifications mounted on the aircraft and/or the module for acquiring operational specifications of the aircraft is able to acquire defect, failure and/or dispatch data from the aircraft, the airplane context including the structural data relative to the aircraft and/or the defect, failure and/or dispatch data of the aircraft;
- the module for computing flight data includes an application for computing aircraft weight and balance, capable of computing a center of gravity of the aircraft and a high-speed performance computing application as a function of the computed center of gravity, and actual operational specifications of the aircraft, the computing module being capable of computing the proposed flight data using at least the high-speed performance computing application;
- the flight data computing module is capable of computing a weight at takeoff or landing of the aircraft on a given terrain, using a low-speed performance determining application capable of determining the maximum weight of the aircraft allowing the aircraft to take off and/or land on the given terrain.

A method for establishing an operational flight plan of an aircraft is also provided including the following steps:

- providing a system as defined above;
- acquiring basic flight data from an external flight plan development system via the flight data acquisition module, the basic flight data comprising at least one theoretical fuel weight to be loaded into the aircraft;
- acquiring actual operational specifications of the aircraft via the operational specification acquisition module, the operational specifications including at least one airplane context;
- computing proposed flight data via the module for calculating proposed flight data including at least one proposed weight of fuel corresponding to the or each theoretical weight, calculated based on actual operational specifications of the aircraft and a specified trajectory of the aircraft;
- displaying, on the viewer, via the display management assembly, a proposed flight data display window including at least the proposed weight of fuel.

The method according to the invention may comprise one or more of the following features, considered alone or according to any technically possible combination:

- it comprises loading, in a flight management system, proposed flight data and/or flight data entered by the user using the display window, via a module communicating with a flight management system;
- it comprises acquiring navigation data read during the flight by the flight management system for at least some of the waypoints of the aircraft along the specified trajectory via a communication module with a flight management system;
- it comprises automatically developing an end-of-flight reading including at least part of the navigation data read during the flight via an automatic development module of the establishment system, and unloading the end-of-flight statement to a ground system via an unloading module of the establishment system.

BRIEF SUMMARY OF THE DRAWINGS

The invention will be better understood upon reading the following description, provided solely as an example and done in reference to the appended drawings, in which.

DETAILED DESCRIPTION

Figure 1:
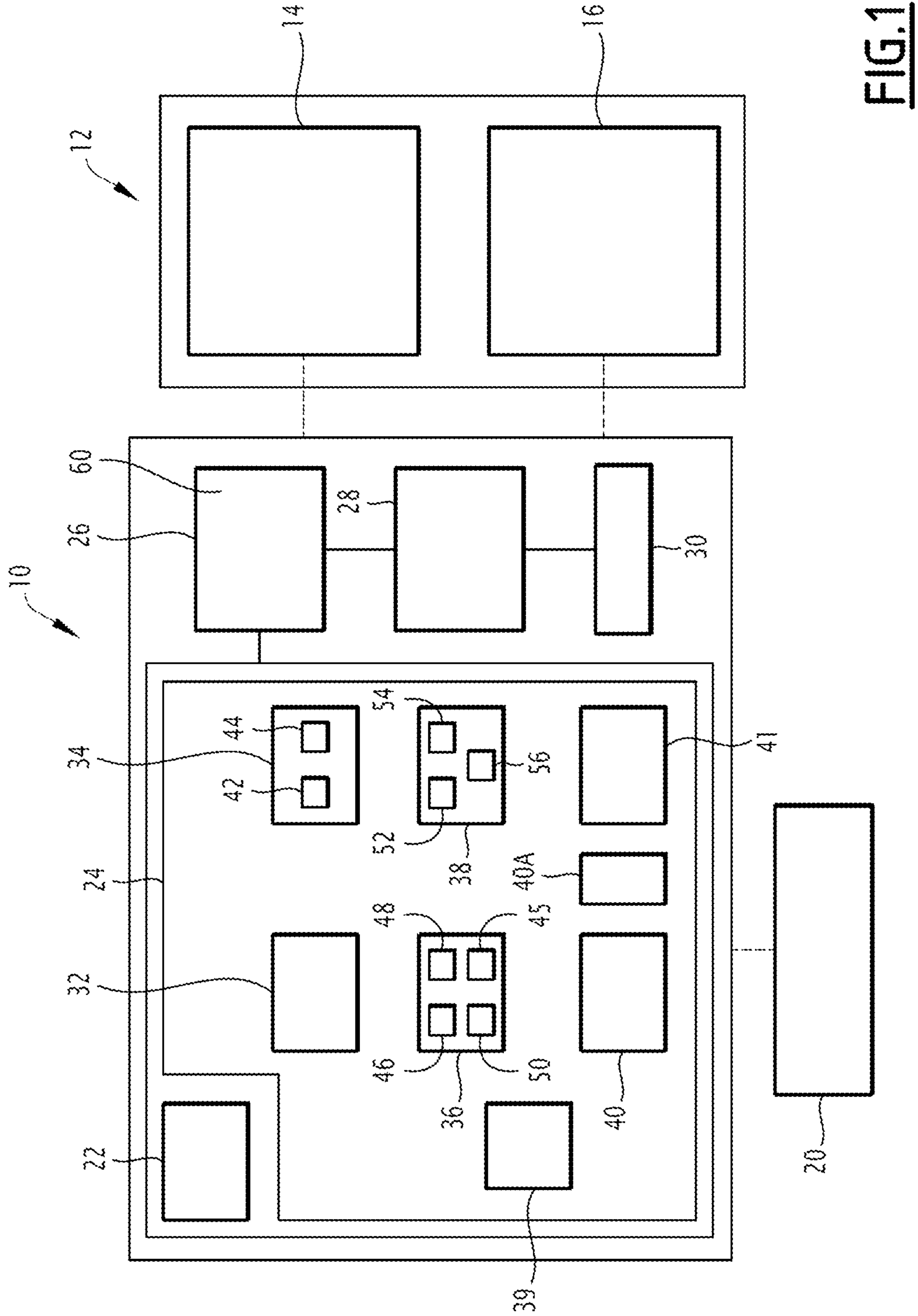
FIG. 1 is a schematic view of a first aircraft operational flight plan establishment system according to an embodiment of the invention.

A system 10 for establishing an operational flight plan of an aircraft is illustrated schematically in FIG. 1. The system 10 is intended to be used in particular by the crew of the aircraft in the cockpit 12 or outside the latter.

The aircraft is preferably a civilian aircraft, preferably a business plane.

In a known manner, the cockpit 12 of the aircraft is intended to control all of the systems of the aircraft during its use.

The cockpit 12 in particular includes a flight management system (FMS) 14 and a system 16 for managing and monitoring the various airplane systems.

The flight management system 14 is intended to aid the pilot of the aircraft in navigating the aircraft during a mission. It is able to provide information in particular on the route followed by the aircraft, and the evolution parameters of the aircraft, such as the fuel consumption.

It is also able to guide the aircraft to cause it to follow a preset trajectory between a first geographical point of origin and a second destination geographical point.

The system 16 for managing and monitoring the various airplane systems is in particular intended to allow the crew to monitor and optionally control all of the aircraft systems. It is in particular capable of determining an operating state of the aircraft, in particular in the presence of flaws and failures present on the aircraft on the ground and/or in flight.

As will be seen below, the establishment system 10 is able to connect to the flight management system 14 to unload flight data relative to the mission into the flight management system 14, and to recover navigation data from the flight management system 14. It is able to connect to the management system 16 to read information relative to the structure and state of the aircraft in order to use it in determining the operational flight plan.

The operational flight plan is a set of specific information regarding a projected mission of the aircraft, advantageously communicated to air traffic control entities. It in particular contains information on the identity and characteristics of the aircraft, the on-board load excluding fuel, the on-board fuel, the various characteristic weights of the aircraft, the takeoff and landing targets, and the description of the trajectory, including the waypoints of the aircraft during the mission.

As will be seen below, the operational flight plan is developed by the establishment system 10 in the form of a computer file initially containing flight data, and after the mission, in addition to flight data, navigation data read during the mission.

The mission carried out by the aircraft includes at least one leg between a first geographical point of origin and a second destination geographical point. In some cases, the mission performed by the aircraft includes a plurality of successive legs, the second geographical destination point of a first leg constituting the first geographical point of origin of a second leg.

The mission is carried out by following operational specifications that in particular comprise a mission context and an airplane context.

The mission context for example includes at least one operating constraint and/or criterion, in particular a number of passengers to be carried, a maximum weight at takeoff in particular related to an available runway length, a navigation fuel load, a reserve fuel load, an imposed takeoff time and/or arrival time, a maximum distance to be traveled and/or a distance to an alternative terrain en route.

The mission context advantageously comprises navigation constraints, for example prohibited zones or flight levels, imposed airways or flight levels, or more generally free flight zones and/or flight zones imposed by the airways.

The mission context advantageously comprises weather constraints such as ice formation or weather avoidance zones (cumulonimbus, for example).

The mission context optionally comprises passenger comfort criteria, in particular turbulence zones to be avoided, in particular as a function of a desired turbulence level, for example chosen from a low level, a medium level, and a high level of turbulence, or satellite telecommunications coverage zones in order to allow telecommunications between the aircraft and the outside world, in particular on the ground, in particular chosen from among a low level, a medium level and a good level of communication possibilities.

The airplane context comprises structural equipment specificities of the aircraft including structural data of the aircraft, in particular the aircraft type, as well as the particular structural characteristics of said aircraft, for example the type and/or the age of the engines, the presence of options such as structural modifications mounted on the aircraft, for example winglets.

The airplane context further comprises usage constraints related to dispatches and/or constraints related to a particular state of the aircraft in terms of defects and/or failures on one or several pieces of equipment of the aircraft.

For example, a dispatch related to certain defects of the aircraft may impose a maximum flight level and/or a maximum speed. A failure to retract the landing gear or a flap may also impose an increased fuel consumption constraint.

Likewise, structural modifications made to the aircraft may affect the fuel consumption.

The operational flight plan of the aircraft is for example established from data from a basic flight plan obtained by a flight plan establishment development system 20 present at a flight plan service provider, outside the aircraft.

The development system 20 is in particular able to calculate basic flight data of the basic flight plan including at least estimated weights of fuel to be on board, estimated weights of the aircraft, a specified trajectory between the first geographical point and the second geographical point, based on the general type of aircraft intended to perform the mission, navigation constraints, in particular the desired departure and/or arrival time in particular from air traffic control, observed weather on the trajectory.

These basic flight data are, however, computed by the service provider without taking account of the airplane context, or all of the mission criteria and/or constraints for the aircraft intended to perform the mission, in particular its particular structure, its equipment, its structural modifications or usage constraints, in particular dispatches and/or the particular state of the aircraft in terms of defects and/or failures on one or several pieces of equipment of the aircraft.

The characteristic fuel weights in the operational flight plan for example include a base weight DEST making it possible to reach the second geographical point along the trajectory, a reserve weight related to the route RTE.R, a reserve weight ALT.R related to a potential diversion to a diversion airport, optionally a final reserve weight FIN.R related to a potential weight at the destination point, a possible fuel weight related to an isolated zone EROPS, the sum of the previous weights defining a required fuel weight REQD.FUEL.

The characteristic fuel weights further include an additional reserve weight XTRA chosen by the crew, a weight TAXI related to taxiing and a total fuel weight TTL.FUEL or TOF corresponding to the sum of the required fuel weight REQD.FUEL and the weights XTRA and TAXI.

Optionally, the basic data of the basic flight plan further include, for each of the weights, the flight time corresponding to the considered fuel weight.

The characteristic weights of the aircraft comprise the empty weight BASIC WT of the aircraft with no passengers, or fuel, the weight of the payload PLD comprising the passengers and the freight, the weight of the aircraft without fuel in the aircraft ZFW (or "Zero Fuel Weight"), the total weight of fuel TOF, the total takeoff weight of the aircraft TOW determined according to the formula TOW=ZFW+TTL.FUEL−TAXI, the fuel weight EBO intended to be consumed during the mission, and the fuel weight at landing LAW corresponding to the difference between the total takeoff weight of the aircraft TOW and the fuel weight EBO.

The specified trajectory includes a series of waypoints, each characterized by flight data including the name of the waypoint, the geographical coordinates of the waypoint, the navigation route AWY, the distance traveled DST from the last waypoint, the flight level FLT, the average wind WIND, the headwind component parameter COMP, the true airspeed TAS, the static temperature parameter SAT, the turbulence level SHR.

The waypoints are further characterized by a time elapsed since the last waypoint EET, the total flight time parameter CTME, the estimated remaining fuel to waypoint parameter E.RF, the estimated quantity of fuel used EFUSED to said waypoint and the estimated weight of the aircraft at said waypoint E.WT, the magnetic heading parameter AMC, the estimated time of arrival ETA, the actual time of arrival ATA, the actual remaining fuel A.RF and the actual weight parameter A.WT.

Advantageously, the basic flight data include the true cap TCA, the minimum of road altitude MORA, the tropopause level TRP, the ground speed GS, the remaining ground distance RDST, the remaining air distance RNAM.

The flight plan establishment system 10 is preferably integrated within an electronic flight bag (EFB) for example assuming the form of a portable electronic device, in particular a laptop computer or a tablet.

The portable electronic device is for example connected to the development system 20, by a wireless datalink according to a wireless transmission protocol for example of the Wi-Fi type (for example according to Standard IEEE 802.11) or the Bluetooth type (for example according to Standard IEEE 802.15-1-2005).

The basic flight data of the flight plan supplied by the development system 20 are transmitted to the establishment system 10 by a datalink, for example according to standard ARINC 633.

The establishment system 10 is able to establish proposed flight data comprising at least a proposed fuel weight, computed based on actual operational specification data of the aircraft, in particular of the airplane context, weight and balance data of the aircraft and data of the system 20.

The establishment system 10 is further able to determine a takeoff and/or landing target on a given runway.

The weight and balance data include the position of the center of gravity % MAC, and the coefficient K corresponding to the ratio of the takeoff weight and the landing weight.

The takeoff target is advantageously computed based on input data such as airport data, in particular the ICAO code of the airport, the magnetic orientation of the runway RWY QFU, the takeoff threshold TO threshold, the pressure altitude, the runway slope RWY slope, the standard instrument departure SID and the obstacles.

The input data of the takeoff target include weather data, including the windspeed, the outside air temperature OAT, the atmospheric pressure QNH, the runway conditions (wet, dry, etc.).

The input data of the takeoff target include aircraft configuration data including the winglets and/or the flaps.

The takeoff target includes output data such as the speeds V1, V2, VR on the runway, the speed VFT ("velocity final takeoff"), the speed VREF (reference velocity), the brake-release acceleration, the base field length, the takeoff runway altitude TORA, the takeoff safety altitude, the gross climb gradient, the engine rating at takeoff % N1 and/or the takeoff heading and pitch as well as the maximum takeoff weight MTOW.

The landing target is advantageously computed based on input data such as airport data, in particular the ICAO code of the airport, the landing threshold elevation (or "LD threshold elevation"), the pressure altitude, the displaced threshold, the runway slope RWY slope, and the magnetic orientation of the runway being in service (or "runway QFU").

The input data of the landing target include weather data, including the windspeed, the outside air temperature OAT, the atmospheric pressure QNH, the runway conditions (wet, dry, etc.) and the OPS factors of the regulatory runway length coefficient.

The input data of the landing target include aircraft configuration data including anti-ice use, ice accumulation and the chosen approach.

The landing target includes output data such as the maximum landing weight MLW, the reference velocity VREF, the velocity of approach VAPP, the go-around velocity of flap retraction G/A VFR, the VFT (or "velocity final takeoff"), the length for landing LFL, the landing distance available LDA, the landing distance LD.

In this example, the establishment system 10 includes at least a processor 22 and at least a memory 24 containing software modules able to be run by the processor 22. It includes a viewer 26, a display management assembly 28 on the viewer 26, and a man-machine interface 30.

The memory 24 contains a basic flight data acquisition module 32 supplied by the development system 20, a module 34 for acquiring actual operational specifications of the aircraft in particular from the system 16 for managing and monitoring airplane systems, and a module 36 for computing proposed flight data, based on basic flight data and actual operational specifications.

The memory 24 further includes a module 38 for communicating with the flight management system 14, able to unload flight data toward the flight management system 14, and to acquire navigation data from the flight management system 14, and a module 39 for electronically validating flight data from the flight plan, based on proposed flight data and/or flight data entered by the user.

The memory 24 further includes a module 40 for automatic development of an end-of-flight reading and a module 40A for unloading the end-of-flight statement to a ground station.

The memory 24 further includes a centralized module 41 for controlling the modules 32 to 40.

The module 32 for acquiring basic flight data is able to recover, in electronic form, the basic flight data as defined above, from the development system 20 in order to allow the initialization of the determination of the proposed flight data.

It is advantageously able to communicate, via a data transmission network, in particular a network of the ARINC 633 type, with the development system 20 in order to obtain the data.

The basic flight data are for example transmitted in ".xml" format.

Furthermore, the acquisition module 32 is advantageously able to query a weather database and/or a navigation information database, for example via a data network, in particular a wireless data network.

The weather database contains current and predictive weather information in the navigation zone of the aircraft between the point of origin and the destination point.

This weather data is provided on several flight altitude levels, for example every 304 m (1000 feet), at an altitude for example between 0 m and 15,545 m (51,000 feet).

The weather data is provided in terms of altitude, but also "around the flight plan" to provide a weather component evolving over time.

This weather data in particular includes the speed and direction of the wind, temperature, pressure, precipitation, dangerous phenomena (ice, storms/cumulonimbus), turbulence, tropopause level, volcanic ash clouds, dust/sand clouds, visibility, as well as aeronautic observations over the zone or en route such as the Meteorological Aerodrome Report (METAR), Terminal Aerodrome Forecast (TAF), Pilot Reports (PIREPS), and Significant Meteorological Information (SIGMET). It optionally includes the definition and evolution over time and space of the geographical coordinates of ice formation or weather avoidance zones and/or turbulence zones.

The navigation information database contains informational data on the terrain at the point of origin and the destination point, and between these points. The navigation information database advantageously comprises a navigation sub-database (waypoints, routes, etc.) and an airport sub-database (runway lengths, runway orientations, slopes, etc.).

It advantageously contains the definition of the geographical coordinates of prohibited zones and/or flight levels, in particular due to geopolitical data, and/or imposed airways.

It optionally includes the definition of satellite telecommunications coverage zones.

In this example, the module 34 for acquiring operational specifications of the aircraft includes an application 42 for determining structural specifications of the aircraft and an application 44 for determining an operational status of the aircraft.

The application 42 for determining structural specifications is able to acquire structural data of the aircraft, in particular the aircraft type, as well as the particular structural characteristics of said aircraft, for example the type and/or the age of the engines, the presence of options such as winglets or all of the modifications mounted on the aircraft.

These data are for example obtained from the state of the aircraft directly.

The application 44 for determining an operational status is able to query the system 16 for managing and tracking airplane systems to determine presence data and types of defects or failures present on the aircraft, dispatch presence and type granted for the aircraft.

The computing module 36 includes an application 45 for determining a mission, an application 46 for determining the weight and balance of the aircraft, an application 48 for determining high-speed performance, and an application 50 for determining low-speed performance.

The mission definition application 45 is able to recover operational specifications of the mission from the data acquisition module 32 and/or from a user interface able to authorize the user to enter at least some of the operational specifications.

The operational specifications our for example the geographical origin and destination points, waypoints, desired times, desired loads, a maximum wind on the trajectory, etc.

The user interface is advantageously able to allow the user to define at least a portion of the mission context, in particular the navigation and passenger comfort constraints, and/or to define at least a portion of the airplane context.

An example user interface is described in the French patent application filed under no. 1701234 titled “Aircraft mission computing system comprising a mission deck and associated method”.

The application 46 for determining the weight and balance of the aircraft is capable of determining the position of the center of gravity of the aircraft with no fuel in the aircraft (or Zero Fuel Weight Center of Gravity) and the weight of the aircraft with no fuel in the aircraft (or Zero Fuel Weight), based on the empty weight of the aircraft, equipment on board the aircraft, passengers and/or freight on board, and their position in the aircraft, as well as monitoring of the flight envelope of the airplane (weight–centering diagram) and the outline of the weight/centering diagram.

The application for determining high-speed performance 48 is capable of determining the weight of fuel to be placed on board the aircraft on a given trajectory, for example the specified trajectory provided by the development system 20, using the position of the center of gravity and the weight of the aircraft with no fuel in the aircraft (or Zero Fuel Weight) determined by the application 46, a preset airspeed, for example entered or computed from data entered by the user interface, meteorological data recovered from the meteorological database through the acquisition module 32, in particular wind speeds and temperatures and the airplane context, for example the type and age of the engines, recovered from the acquisition module 34.

The application for determining low-speed performance 50 is capable of determining in particular the maximum weight of the aircraft and the takeoff and/or landing target allowing the aircraft to take off and/or land on terrain, based on runway length data recovered from the database through the acquisition module 32, and meteorological data recovered from the meteorological database through the acquisition module 32.

The communication module 38 includes an application 52 for unloading, toward the flight management system 14, proposed flight data established by the computing module 36 and/or flight data entered by the user, and an application 54 for acquiring flight data developed by the flight management system 14 and an application 56 for acquiring navigation data read during the flight by the flight management system 14.

The electronic validation module 39 is able to allow the user to validate, using an electronic signature, the flight data from the operational flight plan 57, to transmit them to the air traffic authorities.

The development module 40 is able to recover the navigation data read by the navigation data acquisition application 56 in order to establish an electronic navigation reading intended to be sent to a ground station.

The control module 41 is able to control the various modules 32 to 40 in order to establish the operational flight plan 57 (see FIG. 2) according to the steps that will be described later.

The viewer 26 comprises at least one screen 60 here arranged on the portable electronic device.

The display management assembly 28 includes a processor and a memory containing software modules able to be executed to show, on the viewer 26, windows for interacting with the user, examples of which are given in FIGS. 4 to 10.

Figure 4:
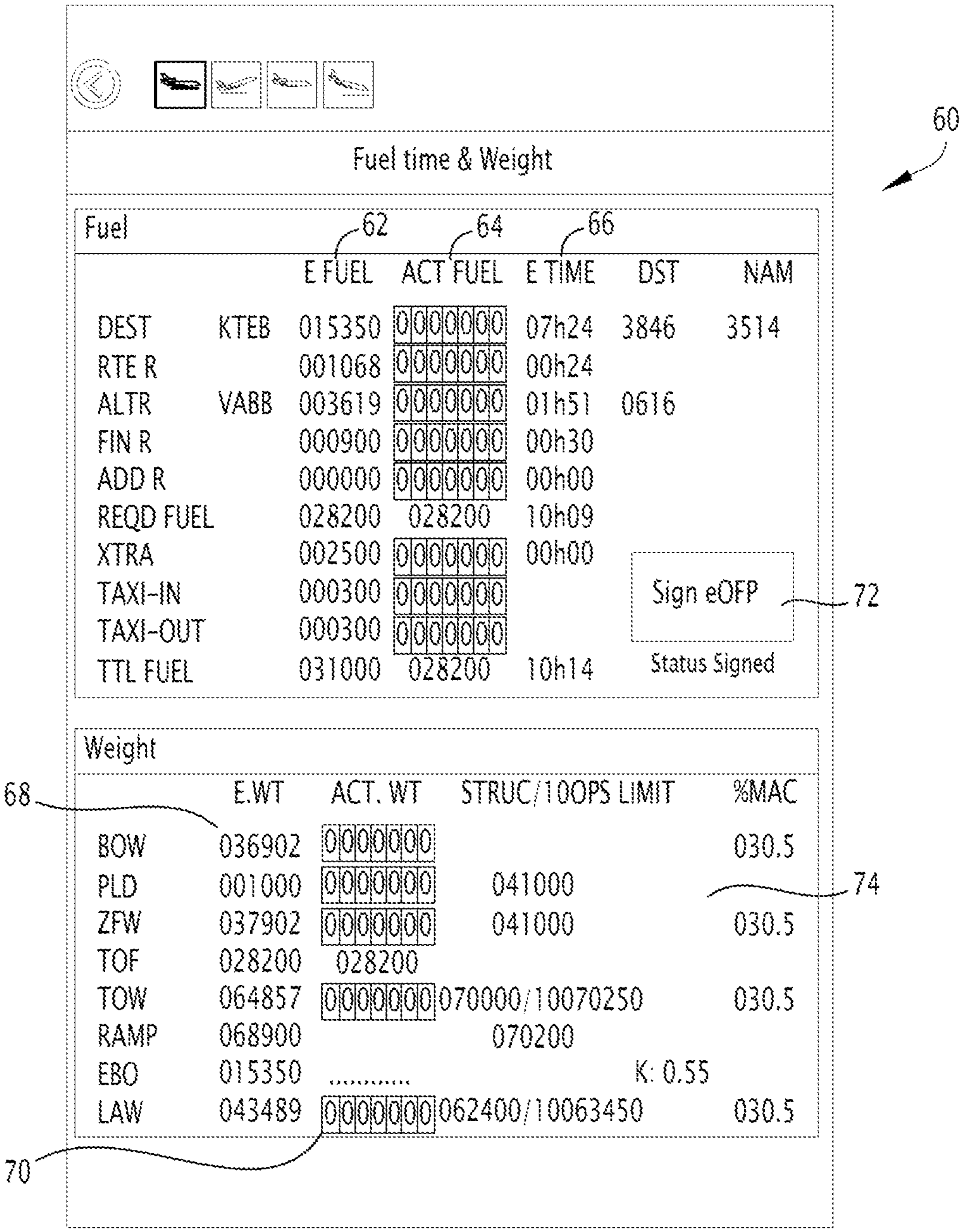
FIGS. 4 to 10 are views illustrating display windows on the viewer of the system of FIG. 1.

The window 60 illustrated in FIG. 4 is a window able to display basic flight data obtained from the developing system 20 of the service provider, and proposed flight data determined by the computing module 36. These data are in particular fuel weight data, aircraft weight data, and estimated flight time data.

The window 60 in this example comprises a first column 62 summarizing the fuel weight data received from the development system 20, and a second column 64 including fuel weight data proposed by the computing module 36.

The fuel weight data of the second column 64 are able to be modified by the user, by entry using the man-machine interface.

The window 60 further includes a third column 66 for estimated flight time corresponding to each fuel weight.

The window 60 comprises, here in another box, a first column 68 summarizing the characteristic weights of the aircraft obtained from the development system 20 of the service provider, and a second column 70 comprising weight data proposed by the computing module 36 and/or by the flight management system 14. The total weight data of the second column 70 are able to be modified by the user, by entry using the man-machine interface 30.

The window 60 further comprises an activation button 72 of the electronic validation module 39 and a display 74 for weight and balance data computed by the determination application 46.

Figure 5:
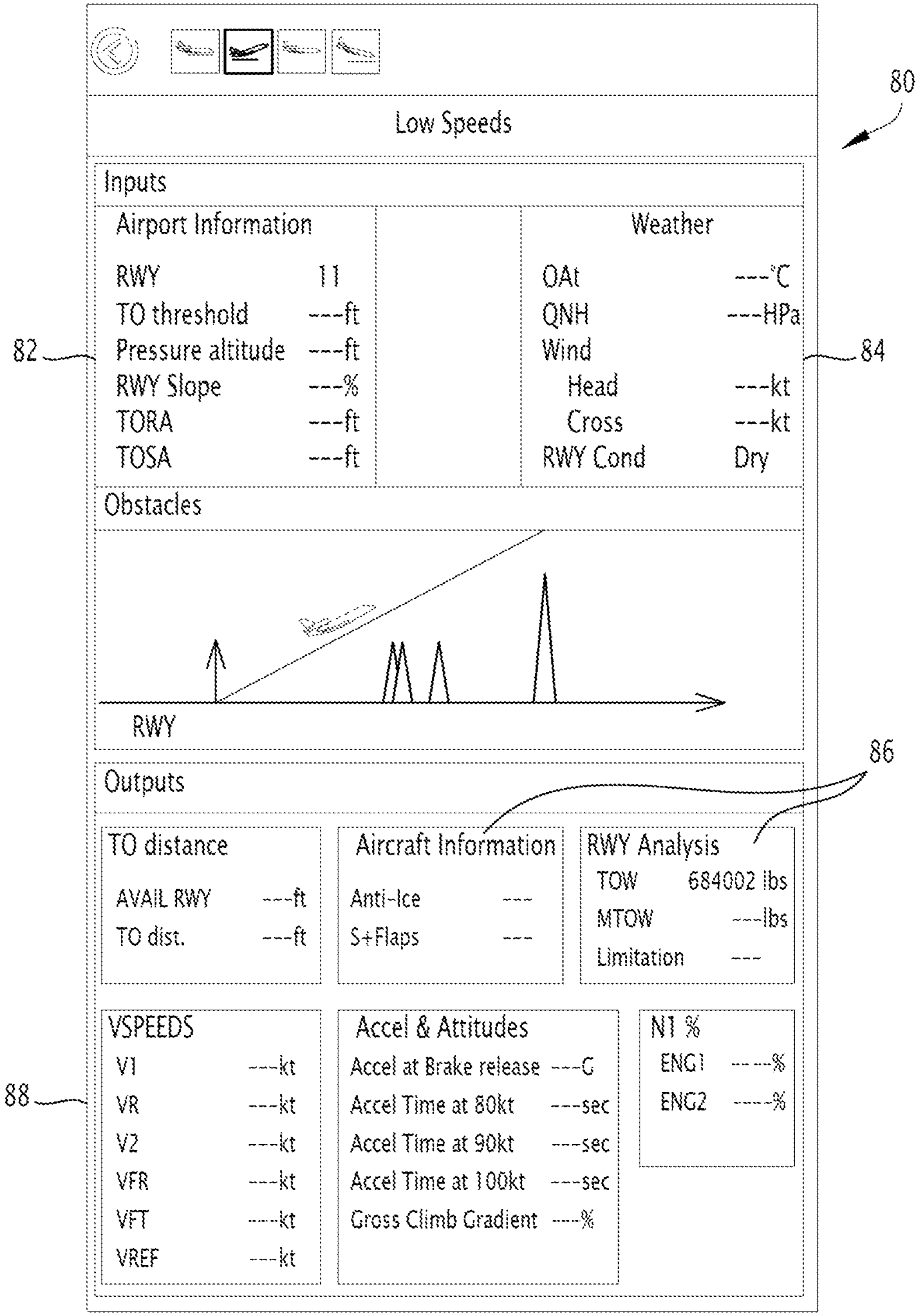

The window 80, illustrated in FIG. 5, is a low-speed data display window, displaying information data 82 on the takeoff terrain coming from the navigation information database, meteorological data 84 coming from the meteorological database, information data 86 on the aircraft and the selected runway, and takeoff and landing target data 88, obtained from the low-speed performance determination application 50.

Figure 6:
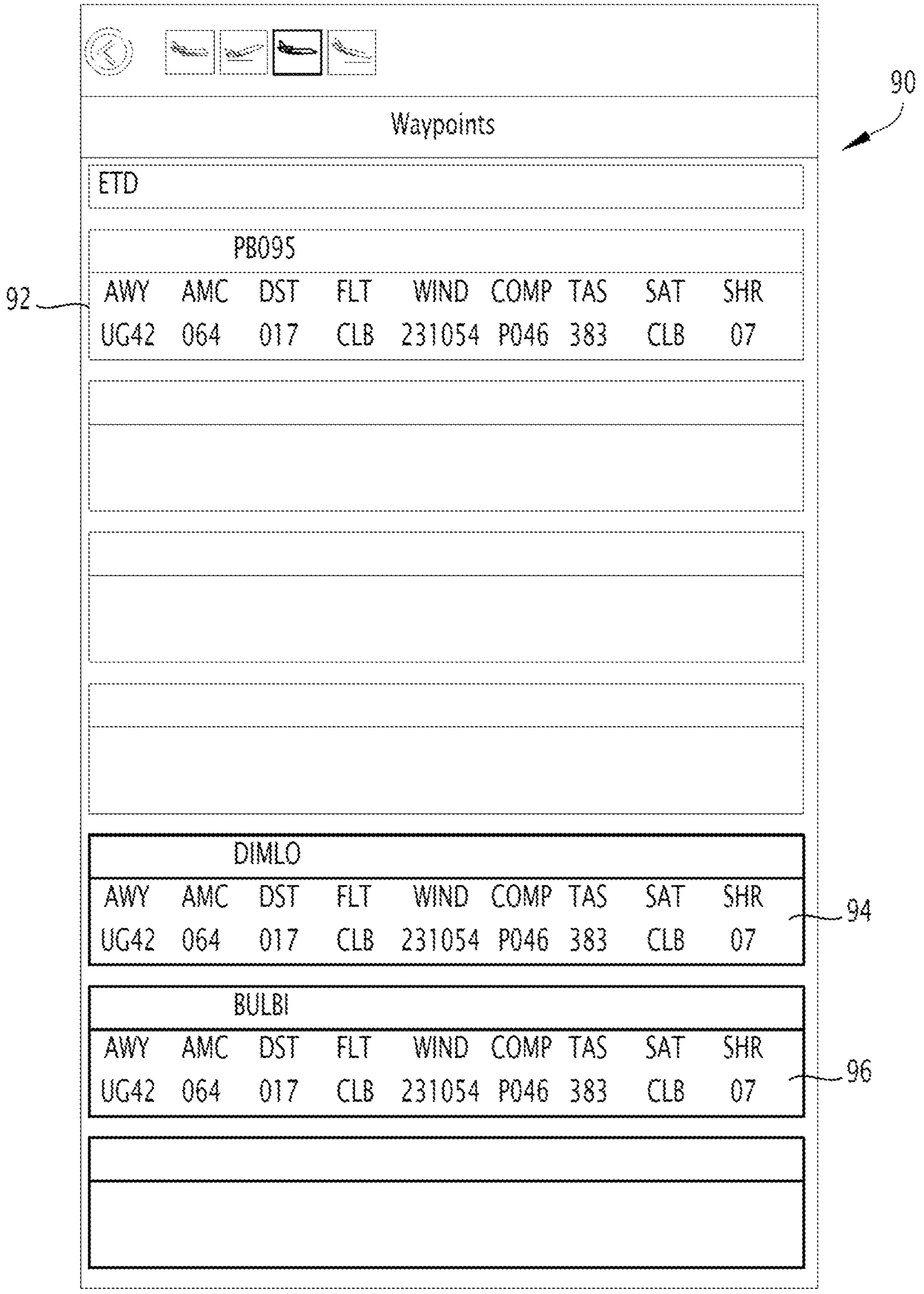

The window 90, illustrated in FIG. 6, is a waypoint display window, which displays estimated flight data, obtained from the development system 20, as defined above.

The window 90 preferably displays, for each waypoint, a box 92, 94, 96 containing the data associated with said waypoint.

In the example illustrated in FIG. 6, at least a first box 92 displays the data relative to a waypoint by which the aircraft has already passed, at least one box 94 displays the data for the next waypoint the aircraft must reach, and a box 96 displays the data of at least one waypoint after the waypoint that the aircraft must reach.

Figure 7:
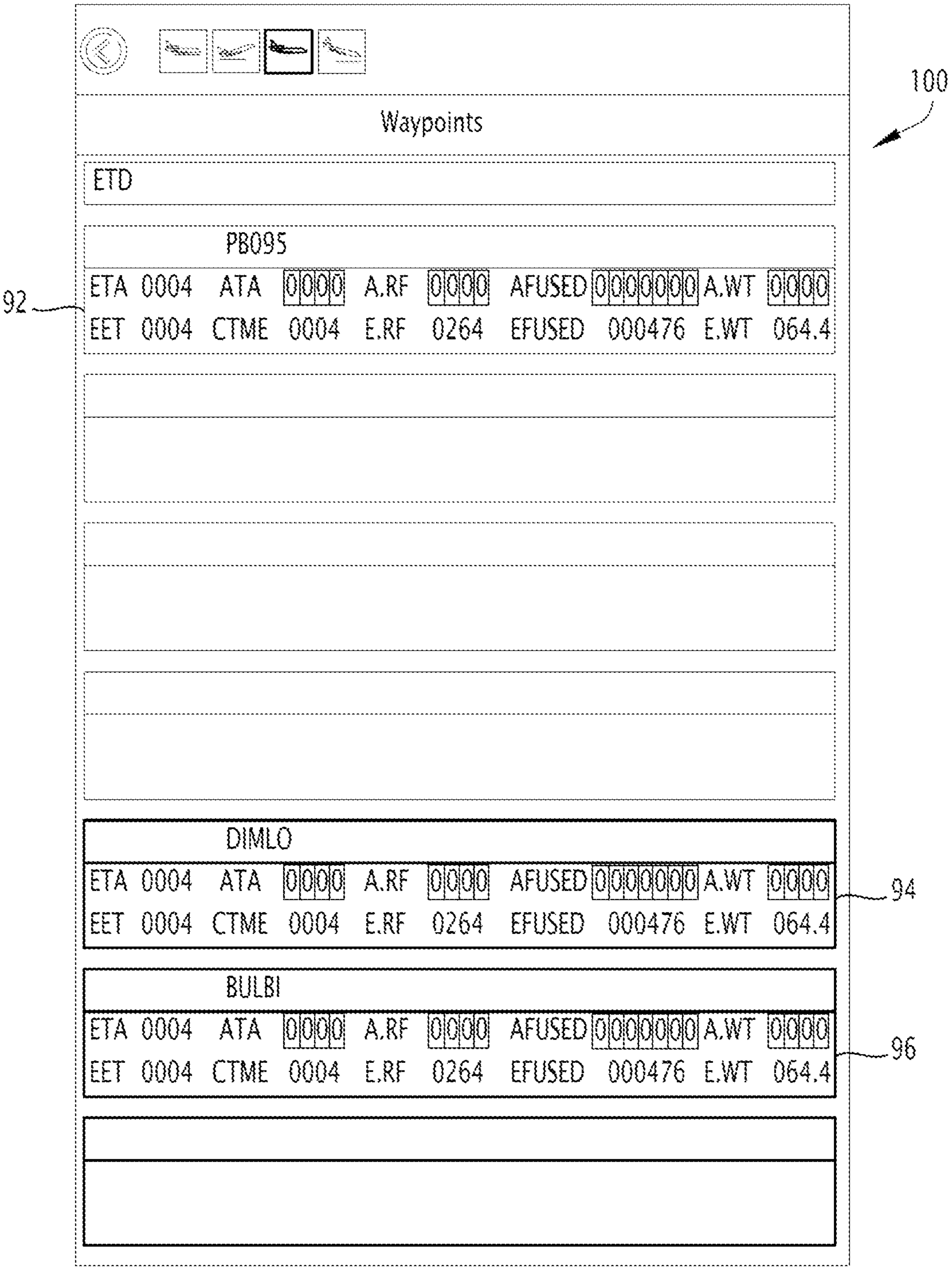

The window 100 illustrated in FIG. 7 differs from that illustrated in FIG. 6 in that the boxes 92 relative to the waypoint by which the aircraft has already passed comprise the navigation data read at this waypoint, either manually by the user, or automatically by the acquisition application 56.

Figure 8:
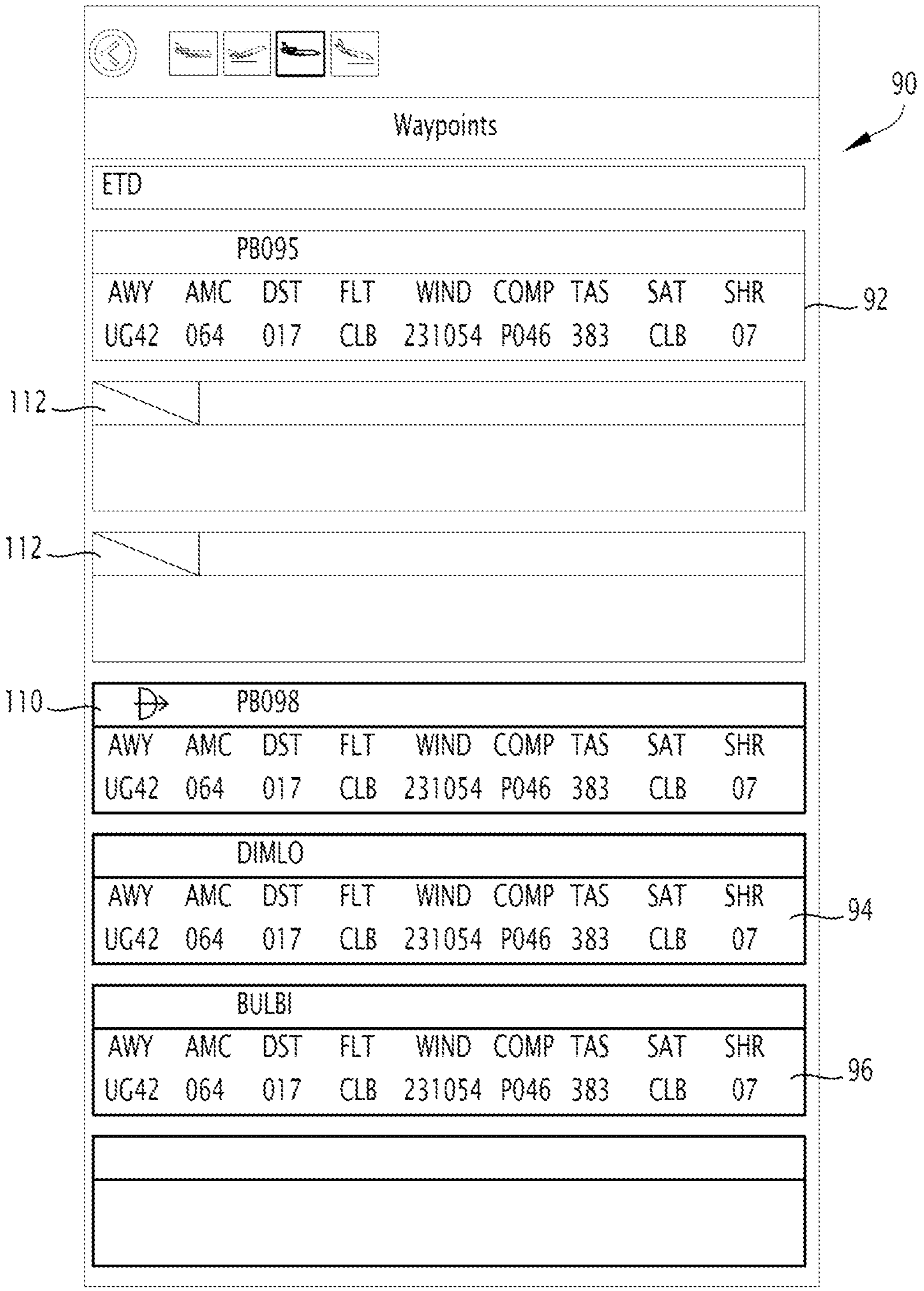

Each box 96 of the window 90 illustrated in FIG. 6 can be activated to allow a direct navigation toward a later waypoint, without passing through an intermediate waypoint. In this case, as illustrated by FIG. 8, a "direct to" navigation symbol 110 is displayed on the selected waypoint and a barred symbol 112 is displayed on the intermediate waypoints by which the aircraft will not pass.

Figure 9:
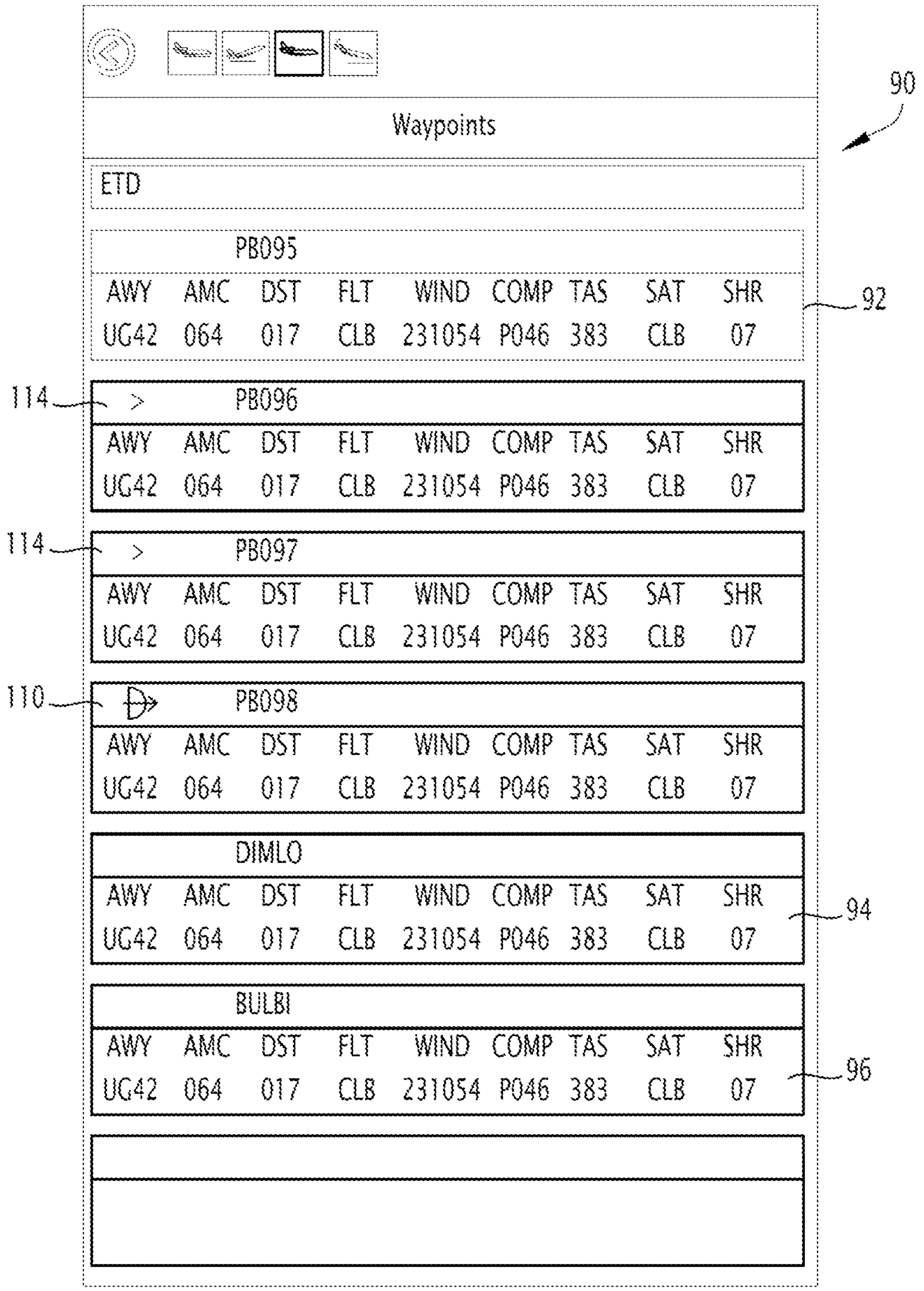

Each box 96 of the window 90 illustrated in FIG. 6 can also be activated to allow a direct navigation toward a later waypoint by passing abeam of certain intermediate waypoints. In this case, as illustrated in FIG. 9, an abeam passage symbol 114 is displayed in the boxes 92 corresponding to the intermediate waypoints.

Figure 10:
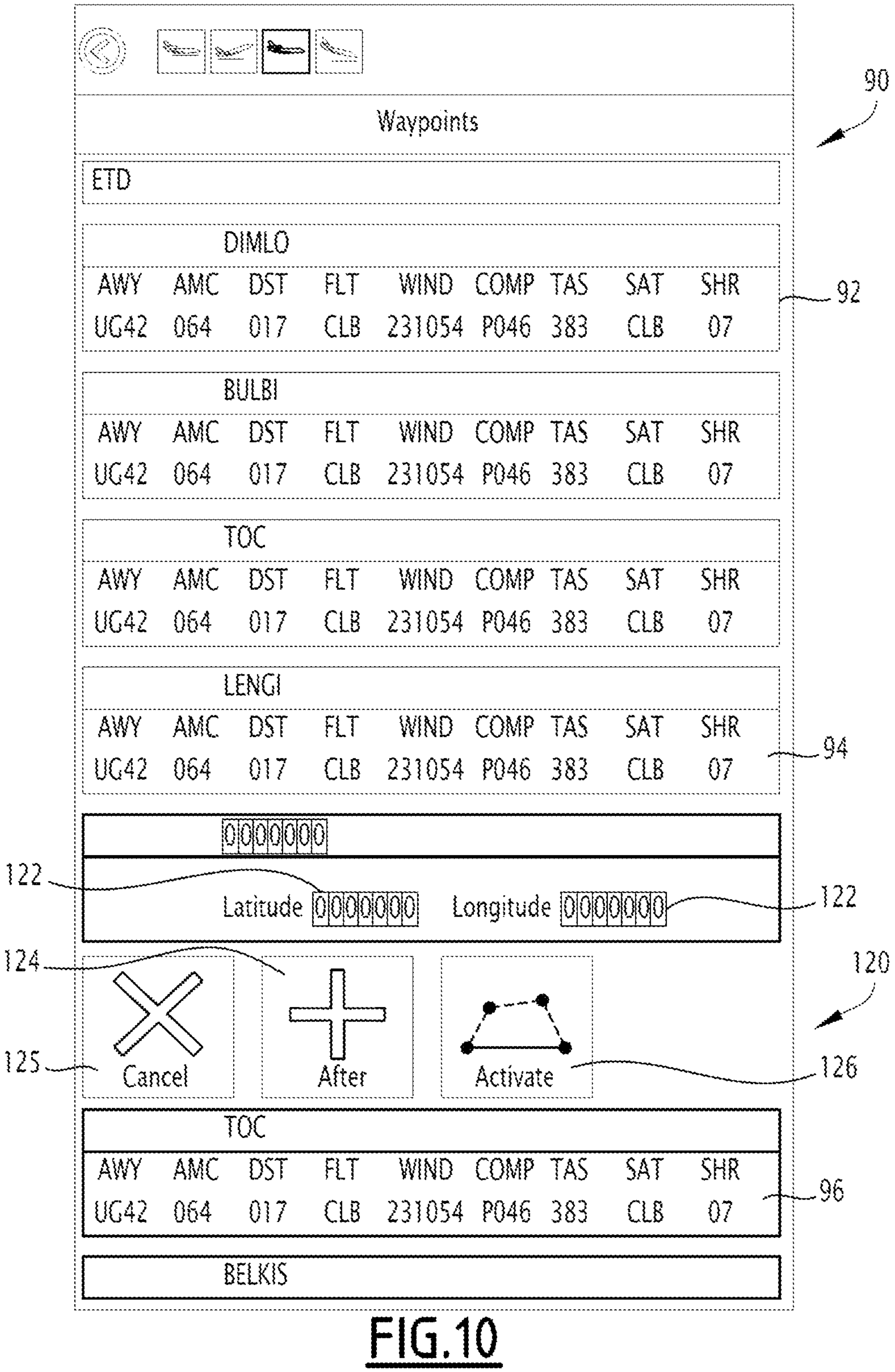

Furthermore, each box 96 of the window 92 illustrated in FIG. 6 can advantageously be activated to allow a trajectory modification. In this case, as illustrated by FIG. 10, a trajectory change interface 120 is displayed in the window 90. The interface 120 includes zones 122 for entering the latitude and longitude of the waypoint to be added, a button 124 for adding a new waypoint, a cancel button 125 and a button 126 for activating the trajectory to insert the added waypoint into the trajectory.

The man-machine interface 30 advantageously includes a member for selecting and entering information by the user, which can be a real or virtual keyboard, a mouse and/or a touch-sensitive screen system.

Figure 2:
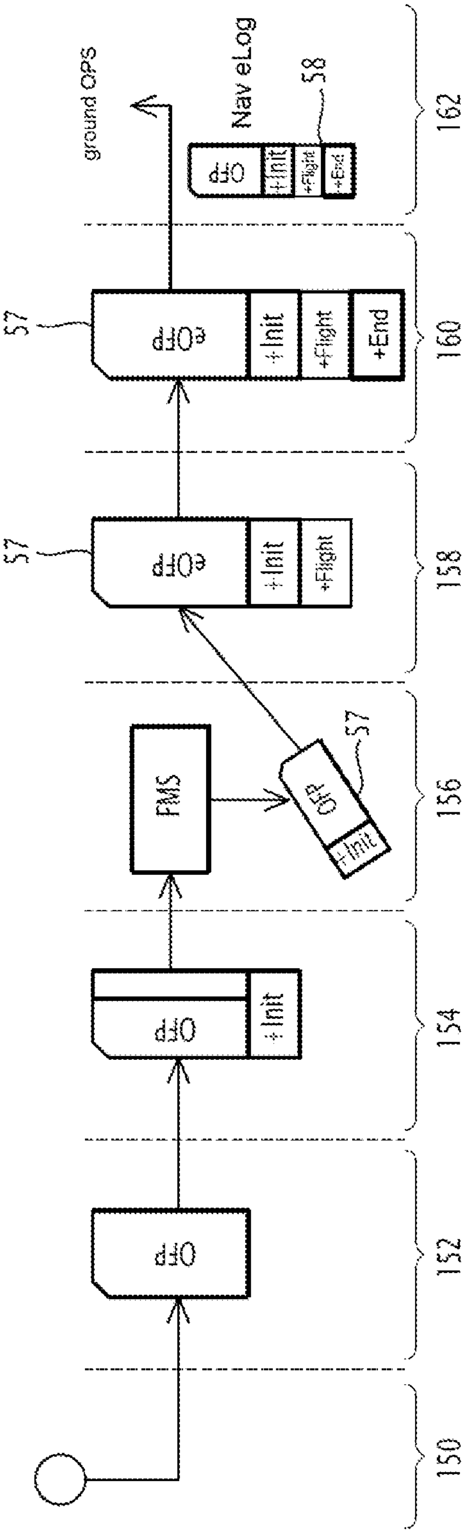
FIG. 2 is a schematic view illustrating successive steps for establishing an operational flight plan using the system of FIG. 1.
Figure 3:
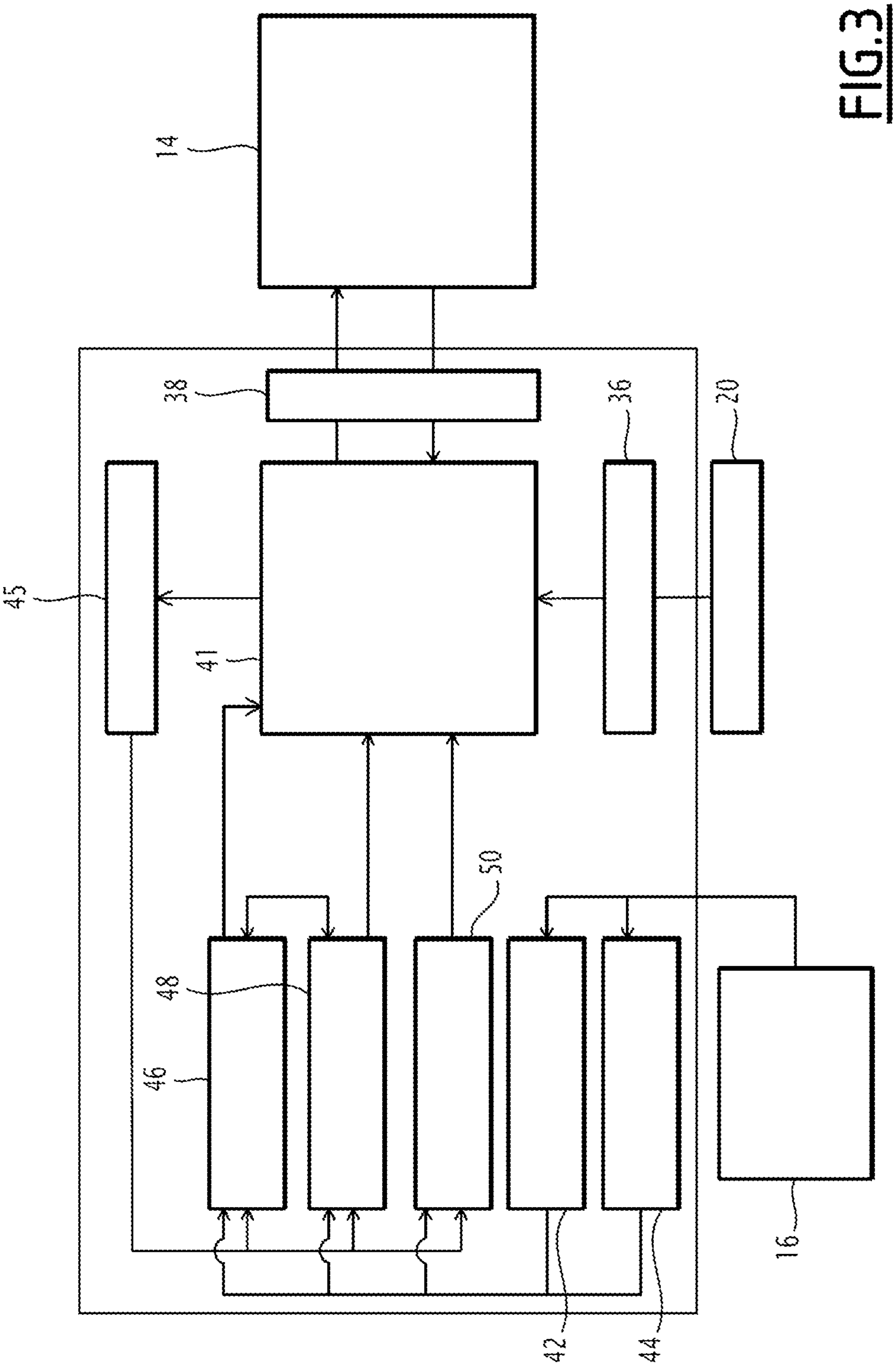
FIG. 3 is a schematic view illustrating the interactions of the modules of the establishment system of FIG. 1 with the flight management system and with an external system of a service provider.

A method for establishing and implementing an operational flight plan according to an embodiment of the invention will now be described, in light of FIG. 2.

Initially, in step 150, an operator asks to perform a mission between a geographical point of origin and a geographical destination point using the aircraft, for example by specifying a departure and/or arrival time.

In step 152, a dispatcher contacts a flight plan service provider to obtain a basic operational flight plan. The service provider uses an external establishment system 20 allowing him to obtain basic flight data, as defined above.

In step 154, the dispatcher recovers the basic flight data from the service provider. The crew of the aircraft then activates the establishment system 10. The control module 41 implements the acquisition module 32 in order to recover the basic flight data of the basic flight plan in electronic form and load them into the memory 24.

The control module 41 also activates the acquisition module 32 so that the acquisition module 32 recovers meteorological data in the meteorological database and navigation information, in particular information regarding the landing and takeoff runways in the navigation information database.

The control module 41 then activates the module 34 for acquiring actual operational specifications.

The application 42 for determining structural specifications recovers the structural specifications of the aircraft, in particular its model, its serial number, the structural elements specific to said aircraft, and any modifications mounted on the aircraft.

The status determination application 44 recovers operational status data of the aircraft, in particular the failures and/or defects present on the aircraft (for example blocked landing gear) and/or the dispatches.

Next, the control module 41 sends the mission definition application 45 mission creation data from among the operational specifications, in particular including the geographical point of origin, the geographical destination point, the arrival and/or departure time, the load.

Optionally, the mission definition application 45 recovers other operational specifications defined by the user using the user interface.

The control module 41 then activates the proposed flight data computing module 36.

The application 46 for determining the weight and balance determines the weight of the aircraft and the center of gravity of the aircraft (Zero Fuel Weight and Zero Fuel Weight Center of Gravity), based on the empty weight of the aircraft, equipment on board the aircraft, passengers and/or freight on board, and their position in the aircraft.

The high-speed performance determining application 48 determines the weight of fuel to be placed on board the aircraft on the trajectory defined between the point of origin and the destination point, using the position of the center of gravity and the weight of the aircraft with no fuel in the aircraft (or Zero Fuel Weight) determined by the application 46, a preset airspeed, for example entered or computed from data entered by the user interface, weather data recovered from the module 41, in particular wind speeds and temperatures, and using the airplane context, for example the type and age of the engines, recovered from the applications 42, 45.

Likewise, based on meteorological data and the airplane context, the low-speed performance determining application 50 determines the takeoff and landing target, including the runway speeds V1, V2, VR, the brake-release acceleration, the engine rating at takeoff and/or the takeoff pitch as well as the computation of the maximum takeoff and landing weights.

The display assembly 28 then displays, on the viewer 26, the window 60 comprising the first column 62 showing the basic fuel weight data obtained from the development system 20 of the service provider, and in parallel at least one proposed fuel weight datum, computed by the computing module 36, taking into account the actual operational specifications, in particular of the airplane context.

Thus, the crew of the aircraft has a second computation source of the on board fuel weight, which it can compare with the basic flight data provided by the development system 20 of the service provider.

These data are more precise, since they are adapted both to the aircraft 12 in which the mission must be carried out, and the actual context of the mission, as it is defined by the crew.

Optionally, the crew adjusts and/or completes one or the other of the proposed fuel weights in the second column 64 using the man-machine interface 30.

The crew can then activate the validation module 39, for example using the activation button 72, to affix an electronic signature on the operational flight plan and send said flight plan to the air traffic control entities.

Once this is done, when the crew is in a final preparation phase of the flight in the aircraft, the aircraft being supplied with electricity, the control module 41 activates the communication module 38 to send the flight data automatically to the flight management system 14.

In step 156, the flight management system 14 loads the flight data, and develops developed flight data, which are displayed on screens of the avionics.

Advantageously, the flight data developed by the flight management system 14 are recovered using the communication module 38 to be loaded in the system 10.

The data developed by the flight management system 14 are compared to the data sent to the flight management system 14 and a consistency check is done by a verification application between the data. The verification application detects and reports, to the crew, inconsistent developed data, such as an incorrect waypoint situated at an excessive distance relative to the other waypoints. The crew may then, if necessary, correct the inconsistent data before starting the mission.

During the flight, in step 158, the crew follows the successive waypoints, using the window 90, which in particular displays, in the boxes 92, the waypoints by which the aircraft has already passed, in the box 94, the waypoint that the aircraft is in the process of reaching, and in the boxes 96, the waypoints that the aircraft must reach next.

When the aircraft reaches each waypoint, the control module 41 activates the data acquisition application 54 of the communication module 38 to recover the navigation data corresponding to said waypoint, in particular the actual time ATA at which the aircraft reaches the waypoint, the actual remaining fuel A-RF parameter, the actual quantity of fuel used AFUSED, and the actual weight of the aircraft A WT.

These data are displayed in the window 100. The crew is therefore free not to recover the aforementioned data at each waypoint, but must just check them, which decreases its workload and allows it to monitor the mission in progress.

In step 160, once the flight is complete, the control module 41 activates the automatic development module 40, which recovers all of the flight data and the read navigation data of the operational flight plan to create an end-of-flight reading in the form of a computer file.

Next, in step 162, the control module 41 activates the unloading module 40A in order to unload the end-of-flight reading to a ground station. The end-of-flight reading is optionally sent to the operator for archiving.

Owing to the establishment system 10 that has just been described, an operational flight plan can be created by computer, simply and precisely, while minimizing crew involvement.

Before the flight, the establishment system 10 is able to provide proposed flight data, in particular at least a proposed weight of fuel to be taken on board, which are adapted to the context of the mission as well as the airplane context of the aircraft in which the mission is carried out. This is in particular the case when the aircraft is operated with specific equipment, defects and failures, or dispatches. Thus, the system 10 takes account of the actual performance of the aircraft, as close as possible to the actual operational state of the airplane, which improves the precision of its operation.

The transmission of data from the service provider to the establishment system 10, and between the establishment system 10 and the flight management system 14, is done automatically, by electronic data transmission. This limits the risk of error, and considerably decreases the crew's workload during the preparation for the flight. Thus, any last-minute changes are less cumbersome for the crew to manage.

During the flight, the navigation data are read automatically by the establishment system 10, preventing copying by the crew, and an end-of-flight reading bearing all of the navigation data can simply be transmitted to a ground station, for archiving, without substantial intervention by the crew.

In a variant, the modules of the system 10 are each made in the form of a programmable logic component, such as an FPGA (Field Programmable Gate Array), or in the form of a dedicated integrated circuit, such as an ASIC (Application Specific Integrated Circuit).

What is claimed is:

1. An aircraft operational flight plan establishing system, comprising:

a basic flight data acquisition unit configured to acquire basic flight data from an external flight plan development system, the basic flight data comprising at least one theoretical fuel weight to be loaded into an aircraft;

an aircraft actual operational specifications acquisition unit configured to acquire actual operational specifications of the aircraft intended to perform the flight according to an operational flight plan, the actual operational specifications including an airplane context;

a proposed flight data calculating unit configured to calculate, before the flight, proposed flight data including at least one proposed total weight of fuel corresponding to the at least one theoretical weight, the proposed flight data being calculated based on the actual operational specifications of the aircraft and on at least one specified trajectory of the aircraft;

a viewer, and a display manager on the viewer, configured to display, on the viewer, a proposed flight data display window including at least the proposed weight of fuel, wherein the aircraft actual operational specifications acquisition unit is configured to acquire defect, failure and/or dispatch data from the aircraft, the airplane context including structural data relative to the aircraft and/or the defect, failure and/or dispatch data of the aircraft, wherein the proposed flight data includes a weight at takeoff or landing of the aircraft on a given terrain, the proposed flight data calculating unit being configured to compute the weight at takeoff or landing of the aircraft on a given terrain, using a low-speed performance determining application configured to determine a maximum weight of the aircraft allowing the aircraft to take off and/or land on the given terrain based on the airplane context.

2. The system according to claim 1, further comprising a communicating unit configured to communicate with a flight management system, and configured to load, in the flight management system, proposed flight data and/or flight data entered by a crew in the proposed flight data display window.

3. The system according to claim 2, wherein the communicating unit is configured to recover, after loading proposed flight data and/or entered flight data, flight data developed by the flight management system based on proposed and/or entered flight data, the system including a consistency checking application configured to check the consistency between the flight data developed by the flight management system and the proposed flight data and/or the entered flight data.

4. The system according to claim 1, further comprising a communicating unit configured to communicate with a flight management system, and configured to acquire navigation data read during the flight by the flight management system for at least one waypoint of the aircraft on a defined trajectory.

5. The system according to claim 4, wherein the display manager is configured to display at least one successive waypoint reading window for reading successive waypoints of the aircraft along the defined trajectory, the successive waypoint reading window including, during flight, the navigation data read for at least one waypoint by the flight management system.

6. The system according to claim 5, wherein the successive waypoint reading window displays the navigation data read for at least a first waypoint by which the aircraft has already passed, and displays the next waypoint to be reached by the aircraft.

7. The system according to claim 4 further comprising an automated development unit configured to automatically develop an end-of-flight reading including at least part of the navigation data read during the flight, and a unloading unit configured to unload the end-of-flight reading to a ground system.

8. The system according to claim 1, wherein the display manager is configured to display at least one successive waypoint displaying window configured to display successive waypoints including at least one trajectory modification symbol illustrating a direct navigation to a later waypoint without passing by at least one intermediate waypoint, and/or an interface configured to allow entering a modification of the specified trajectory.

9. The system according to claim 1, wherein the structural data relative to the aircraft includes structural specificities of equipment of the aircraft, and/or structural modifications mounted on the aircraft.

10. The system according to claim 1, wherein the proposed flight data calculating unit includes an aircraft weight and balance computing application configured to compute a center of gravity of the aircraft and a high-speed performance computing application configured to compute high speed performances of the aircraft as a function of the computed center of gravity, and as a function of actual operational specifications of the aircraft, the proposed flight data calculating unit being configured to compute the proposed flight data using at least the high-speed performance computing application.

11. A method for establishing an operational flight plan of an aircraft including:

providing the system according to claim 1;

acquiring the basic flight data from the external flight plan development system via the basic flight data acquisition unit, the basic flight data comprising the at least one theoretical fuel weight to be loaded into the aircraft;

acquiring the actual operational specifications of the aircraft via the aircraft actual operational specifications acquisition unit, the operational specifications including the at least one airplane context;

computing the proposed flight data via the proposed flight data calculating unit, including the at least one proposed weight of fuel corresponding to the or each theoretical weight, calculated based on the actual operational specifications of the aircraft and the at least one specified trajectory of the aircraft; and displaying, on the viewer, via the display manager, the proposed flight data display window including at least the proposed weight of fuel.

12. The method according to claim 11 further comprising loading, in a flight management system, proposed flight data and/or flight data entered by a user using the display window, via a communicating unit communicating with a flight management system.

13. The method according to claim 12, further comprising acquiring navigation data read during the flight by the flight management system for at least some waypoints of the aircraft along the specified trajectory via a communicating unit with a flight management system.

14. The method according to claim 11, further comprising automatically developing an end-of-flight reading including at least part of navigation data read during the flight via an automatic development unit of the establishment system, and unloading an end-of-flight statement to a ground system via an unloading unit of the establishment system.

15. The method according to claim 11, wherein the proposed flight data calculating unit includes an aircraft weight and balance computing application configured to compute a center of gravity of the aircraft and a high-speed performance computing application configured to compute high speed performances of the aircraft as a function of the computed center of gravity, and as a function of actual operational specifications of the aircraft, the method comprising computing the proposed flight data via the proposed flight data calculating unit using at least the high-speed performance computing application.

16. The system according to claim 1, wherein the airplane context includes a type and/or an age of engines of the aircraft.

17. The system according to claim 1, wherein the airplane context includes a presence of options including structural modifications mounted on the aircraft and/or usage constraints related to dispatches.

* * * * *